US008624758B2

(12) United States Patent
Ingram et al.

(10) Patent No.: US 8,624,758 B2
(45) Date of Patent: Jan. 7, 2014

(54) COMMUNICATION SYSTEM INCLUDING TELEMETRIC DEVICE FOR A VEHICLE CONNECTED TO A CLOUD SERVICE

(75) Inventors: Marc Ingram, Allen, TX (US); Wooyong Ee, Louisville, KY (US)

(73) Assignee: Mavizon, LLC, Louisville, KY (US)

( * ) Notice: Subject to any disclaimer, the term of this patent is extended or adjusted under 35 U.S.C. 154(b) by 340 days.

(21) Appl. No.: 13/070,444

(22) Filed: Mar. 23, 2011

(65) Prior Publication Data

US 2011/0234427 A1 Sep. 29, 2011

Related U.S. Application Data

(60) Provisional application No. 61/316,491, filed on Mar. 23, 2010, provisional application No. 61/316,495, filed on Mar. 23, 2010, provisional application No. 61/394,060, filed on Oct. 18, 2010, provisional application No. 61/411,812, filed on Nov. 9, 2010, provisional application No. 61/430,160, filed on Jan. 5, 2011, provisional application No. 61/430,167, filed on Jan. 5, 2011.

(51) Int. Cl.
*G08G 1/123* (2006.01)

(52) U.S. Cl.
USPC .................................................. 340/995.1

(58) Field of Classification Search
USPC ............ 340/995.1, 992, 993, 995.25, 988, 340/426.19; 701/32.4, 29.1, 400
See application file for complete search history.

(56) References Cited

U.S. PATENT DOCUMENTS

| 6,006,159 | A  | * | 12/1999 | Schmier et al. | ............... 701/465 |
| 6,028,537 | A  | * | 2/2000  | Suman et al.   | ................. 340/988 |
| 8,145,379 | B2 | * | 3/2012  | Schwinke       | ................... 701/33.2 |
| 2006/0217885 | A1 | * | 9/2006 | Crady et al. | .................. 701/213 |
| 2010/0197325 | A1 | * | 8/2010 | Dredge | ...................... 455/456.3 |

* cited by examiner

*Primary Examiner* — Phung Nguyen
(74) *Attorney, Agent, or Firm* — Stites & Harbison, PLLC; David W. Nagle, Jr.

(57) ABSTRACT

A telemetric device for a vehicle includes a location determining device arranged to determine the vehicle's location and a transmitting device arranged to continuously or nearly continuously transmit location data concerning the vehicle in real-time or near real-time. The transmission of the location data is not based on a condition of the vehicle and is without prompting by a user.

35 Claims, 5 Drawing Sheets

COMMUNICATION SYSTEM INCLUDING TELEMETRIC DEVICE FOR A VEHICLE CONNECTED TO A CLOUD SERVICE

The present application claims priority to: U.S. Provisional Patent Application Ser. No. 61/316,491 filed on Mar. 23, 2010; U.S. Provisional Patent Application Ser. No. 61/316,495 filed on Mar. 23, 2010; U.S. Provisional Patent Application Ser. No. 61/394,060 filed on Oct. 18, 2010; U.S. Provisional Patent Application Ser. No. 61/411,812 filed on Nov. 9, 2010; U.S. Provisional Patent Application Ser. No. 61/430,160 filed on Jan. 5, 2011; and U.S. Provisional Patent Application Ser. No. 61/430,167 filed on Jan. 5, 2011.

Furthermore, the entire contents of U.S. patent application Ser. No. 13/070,459 filed on Mar. 23, 2011 and titled "Communication System Including Telemetric Device for a Vehicle Connected to a Cloud Service," are hereby incorporated in their entirety by reference.

BACKGROUND OF THE INVENTION

1. Field of the Invention

The present invention relates to a telemetric device and a communication system including the same. More specifically, the present invention relates to telemetric device for a vehicle connected to a cloud service and a communication system including such a telemetric device.

2. Description of the Related Art

OnStar® provides a service in which a call center is contacted based either on prompting by a user input or based on a change in a condition of a vehicle with the OnStar® service. For example, if the airbags of the vehicle are deployed, then an OnStar® device located within the car contacts the call center. The call center then communicates with the passengers of the vehicle and calls the proper authorities, if necessary. However, the OnStar® service does not continuously provide location data of the vehicle, and the data sent through the OnStar® service requires either prompting by a user or a change in the vehicle condition.

U.S. Pat. No. 6,263,268 discloses a "System and Method for Providing Mobile Automotive Telemetry" in which a remote client provides diagnostic information concerning a vehicle to a server. However, the remote client in U.S. Pat. No. 6,263,268 fails to provide location data, in real-time or otherwise.

SUMMARY OF THE INVENTION

Preferred embodiments of the present invention provide a telemetric device for a vehicle that continuously or nearly continuously transmits location data concerning the vehicle in real-time or near real-time, where the transmission of the location data is not based on a condition of the vehicle and is without prompting by a user.

According to a preferred embodiment of the present invention, a telemetric device for a vehicle includes a location determining device arranged to determine the vehicle's location and a transmitting device arranged to continuously or nearly continuously transmit location data concerning the vehicle in real-time or near real-time. The transmission of the location data is not based on a condition of the vehicle and is without prompting by a user.

The telemetric device is preferably arranged to communicate with a wireless device, for example. The wireless device is preferably a cell phone and/or a tablet computer, for example. The telemetric device preferably communicates directly with the wireless device or communicates with the wireless device via a cellular network and/or the internet, for example.

The telemetric device preferably includes a display device. The location determining device is preferably a GPS device, for example. The transmitting device preferably communicates through a cellular network interface. The telemetric device is preferably connected to the diagnostic system of the vehicle. At least a portion of data transmitted by the transmitting device is preferably encrypted or otherwise secured for transmission. The transmitting device is preferably arranged to transmit data when the vehicle is turned off.

Data transmitted by the transmitting device is preferably transmitted with a transmission frequency between about 10 times a second and about once every 4 minutes, for example. Data transmitted by the transmitting device is preferably transmitted with a variable transmission frequency. Data transmitted by the transmitting device is transmitted with a transmission frequency that is preferably changed based on data volume limitations of a network to which the telemetric device is connected. Data transmitted by the transmitting device preferably includes data indicating the condition of the vehicle.

The vehicle is preferably one of a car, a truck, a train, a plane, a motorcycle, a bus, a recreational vehicle, and a boat, or other movable vehicle or object, for example. The telemetric device further includes at least one wired/wireless cloud communication interface, preferably a cellular network interface, preferably including proprietary TCP/IP based communications, and a wired/wireless communication interface for the vehicle and/or wired/wireless devices in or around the vehicle, and preferably uses one or more interfaces, preferably On Board Diagnostics (hereinafter "OBD"), Bluetooth®, Wi-Fi, and radio frequency (hereinafter "RF"), for example.

According to another preferred embodiment of the present invention, a communication system includes a telemetric device according to a preferred embodiment of the present invention described above, wherein the telemetric device is provided in a vehicle or otherwise operatively connected to a vehicle, and a cloud service connected to the telemetric device via the internet or other suitable network.

The telemetric device and the cloud service are preferably also connected via a public switched telephone network, for example. The telemetric device is preferably connected to a media content provider via the internet.

The above and other features, elements, characteristics, steps, processes, and advantages of the present invention will become more apparent from the following detailed description of preferred embodiments of the present invention with reference to the attached drawings.

DETAILED DESCRIPTION OF PREFERRED EMBODIMENTS

Telemetric Device 20

Figure 1:
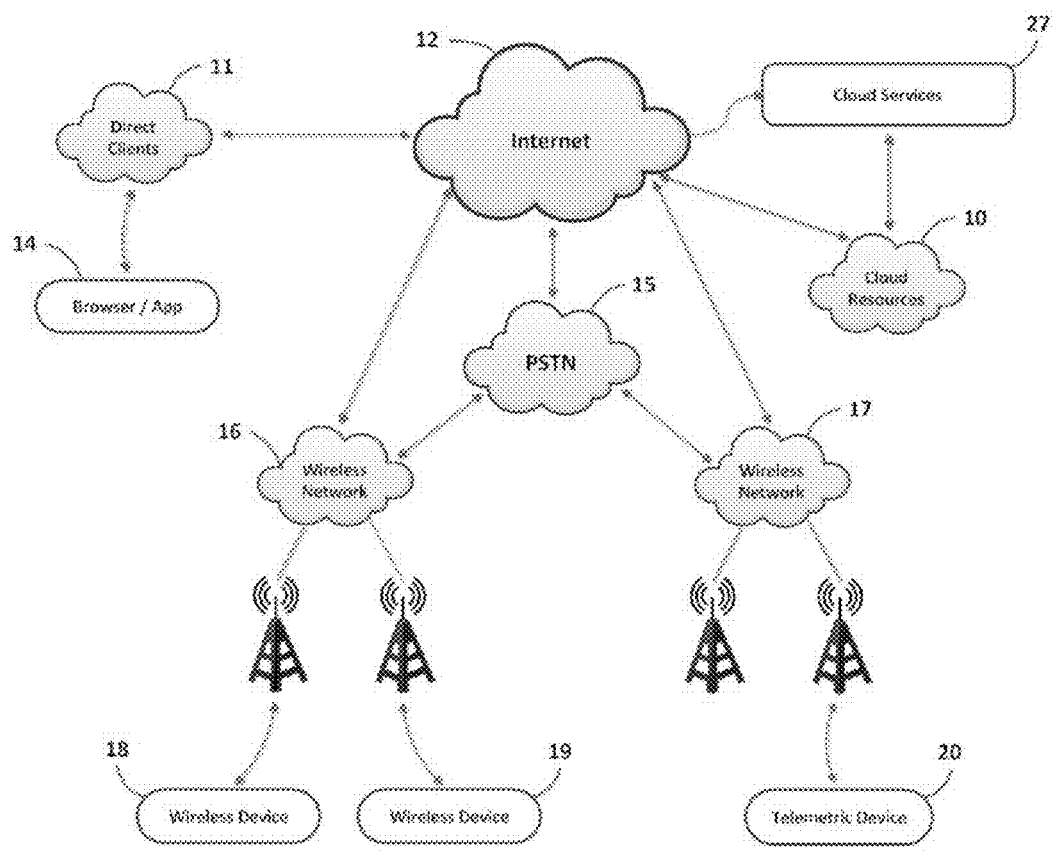
FIG. 1 shows a communication system including a telemetric device according to a preferred embodiment of the present invention.

FIG. 1 shows a communications system including a telemetric device 20 according to a preferred embodiment of the present invention. The telemetric device 20 can connect to the desired cloud services 27 first through wireless networks 17 and then either through a Public Switched Telephone Network (PSTN) 15 and then the internet 12 or directly through the internet 12. FIG. 1 also shows direct clients 11 and their associated communications interfaces, which include a browser or mobile application 14, but can also include other interfaces, for example. FIG. 1 shows wireless devices 18, 19 at different geographic locations and their connection and interface with the cloud services 27 for interoperability with the telemetric device 20. The wireless devices 18, 19 could be connected to one or more telemetric devices, although only one is shown in FIG. 1.

The wireless devices 18, 19 are typically cell phones, but it also possible that other suitable wireless devices can be used. For example, one of the wireless devices 18, 19 could be a tablet computer with a modem allowing it to access the internet via a cellular network.

Cloud resources 10 are connected to the internet 12 and cloud services 27. The cloud resources 10 can include, but are not limited to, third party services such as social networks (e.g. Facebook.com, LinkedIn.com, etc.), blogs or microblogs (Twitter.com, blogger.com, etc.), location-based networks (Gowalla.com, Foursquare.com, etc.), and other services (Gowalla.com, Livingsocial.com, Mint.com, etc.) that can connect to the cloud services 27, allowing interoperability with the telemetric device 20 and shared resources/information.

Figure 2A:
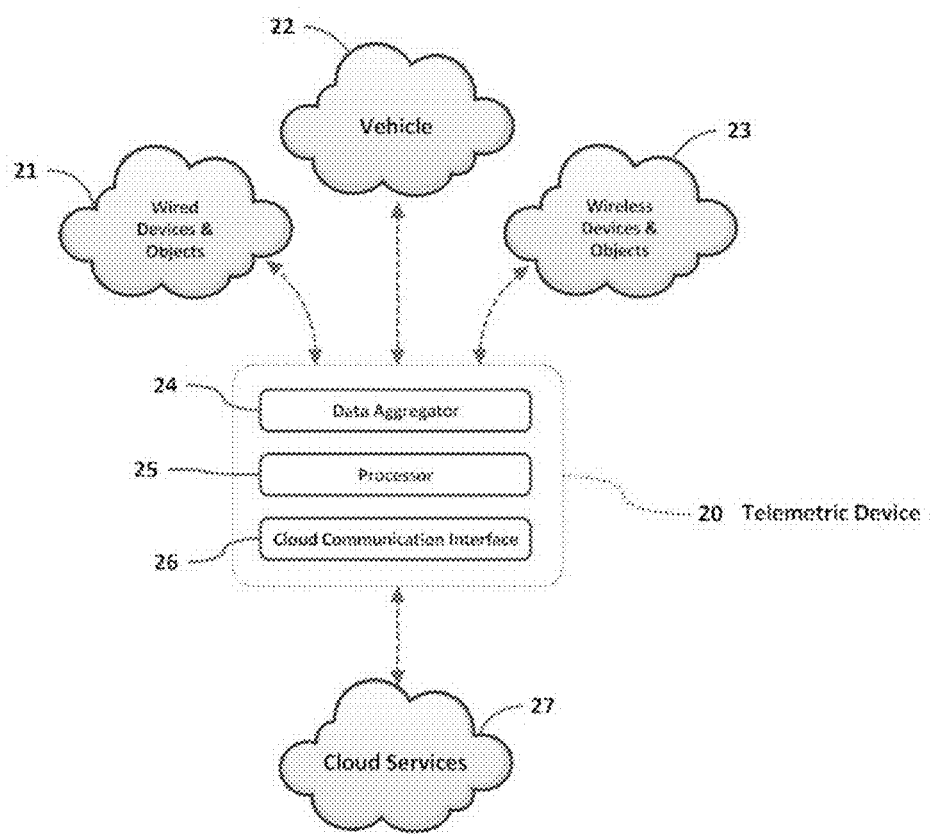
FIGS. 2A and 2B are schematic diagrams of a telemetric device according to a preferred embodiment of the present invention.
Figure 2B:
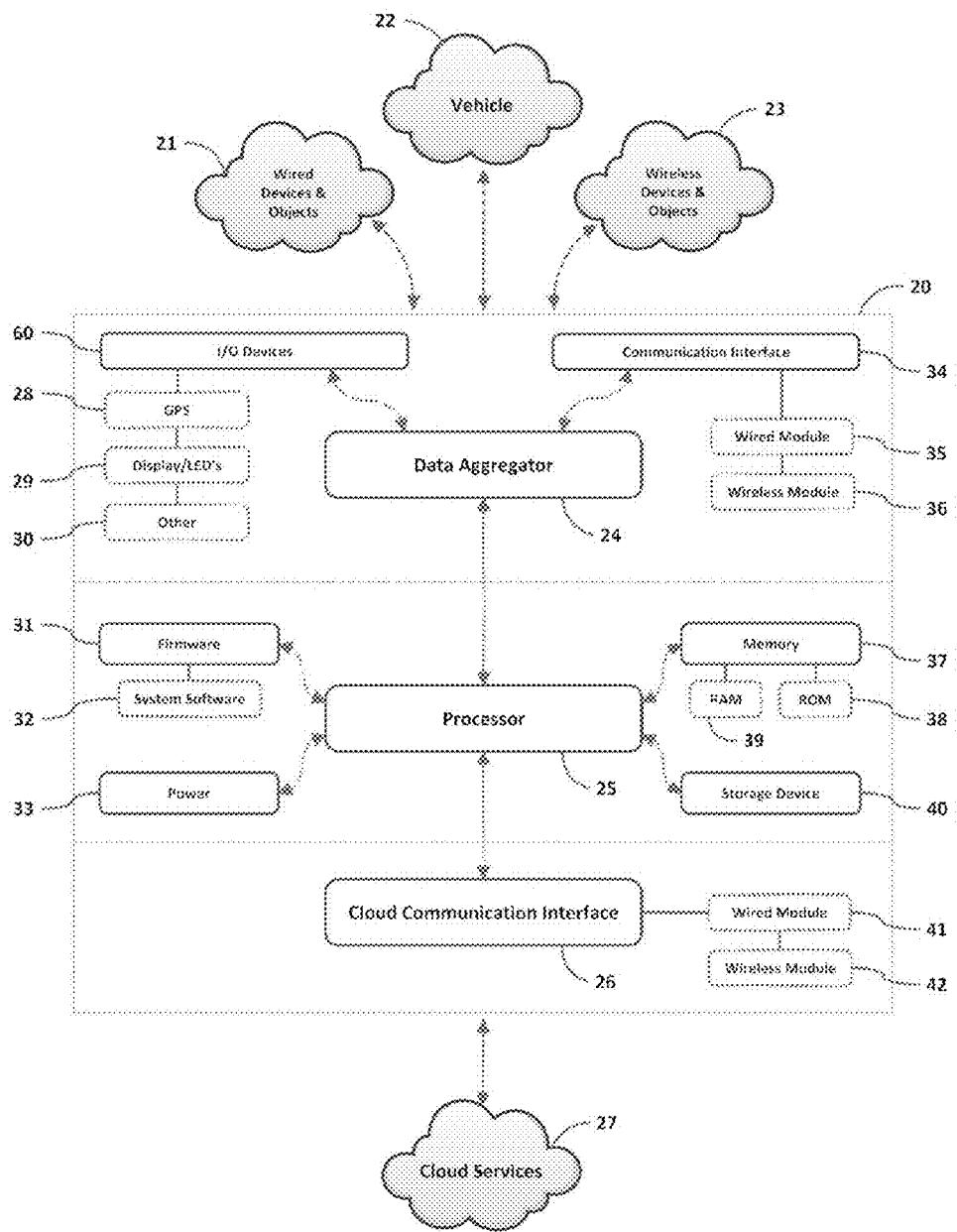

FIGS. 2A and 2B show a telemetric device 20 according to a preferred embodiment of the present invention. The telemetric device 20 is preferably included in a vehicle (not shown in the drawings). The telemetric device 20 is primarily used for the remote measuring, reporting, and communication of data. Further, the telemetric device 20 can bidirectionally communicate data to and from the cloud services 27. The data can include executable logic, firmware or software, rich content, methods, codes, commands, operations, queries, responses, services such as a voice or data gateway (e.g., the internet) or any other suitable data that may or may not be specific to the device. The telemetric device 20 can provide vehicle specific data, such as, but not limited to, location, speed, acceleration, diagnostic data, specific communication protocols and codes used by the vehicle or vehicle manufacturer, other conditions of the vehicle. The telemetric device 20 can provide data that is not specific to the vehicle, such as the global positioning location, ambient air temperature, motion, time, date, video from a camera mounted on or within the vehicle, audio that is internal or external to the vehicle, communication or wireless spectrum in or near the vehicle (e.g., radio, near field communications, personal, local, and wide area network frequencies), for example. Additionally, the telemetric device 20 can include additional logic for the remote operation, enhancement, and automation of the vehicle's functions, applications, devices, properties, etc. and the wired/wireless devices in or around the vehicle. The telemetric device 20 can communicate with any suitable wired/wireless device, including, but not limited to, vehicle entry systems, cell-phones, PDAs, laptops, computers, RFIDs, and other suitable portable electronic devices, for example.

The telemetric device 20 can be wired or wirelessly coupled to a vehicle. The vehicle to which the telemetric device 20 is coupled can be, but is not limited to, a car, a truck, a train, a plane, a motorcycle, a bus, a recreational vehicle, a boat, or any other suitable vehicle, for example. The telemetric device 20 can be included with the vehicle during the manufacturing of the vehicle as original equipment or can be added to the vehicle as an after-market product. The telemetric device 20 can be attached to the vehicle at any suitable location on the vehicle. For example, as original equipment of the vehicle, the telemetric device 20 can be an integral portion of the dashboard of the vehicle. Additionally, the telemetric device 20 can be attached to the vehicle's dashboard, storage compartment, electronic control module (ECM) or electronic control unit (ECU), fuse box, diagnostic gateway, or the vehicle's electrical system, either by wired or wireless connection.

A diagnostic gateway is any interface or interfaces through which diagnostic data can be obtained. For example, a typical diagnostic gateway is a diagnostic port such as a vehicle's on-board diagnostic (OBD) port. OBD ports can either be OBDI, OBD1.5 or OBDII. Other diagnostic gateways are JOBD for vehicles in Japan, EOBD for vehicles in Europe, and controller-are network (CAN). Alternatively, the diagnostic gateway could be directly connected to the ECM or ECU of the vehicle 22. In addition, the diagnostic gateway could include individual vehicle components or systems. For example, the diagnostic gateway could include the tire pressure sensors. The diagnostic gateway can be wired or wireless. For example, if the diagnostic gateway includes the tire pressure sensors, then the tire pressure sensors can transmit data concerning the pressure in the tires either over a wire or through the air wirelessly. It is also possible that the diagnostic gateway includes multiple interfaces. For example, the diagnostic gateway could include the OBDII port and the tire pressure sensors. The communication between the telemetric device 20 and the diagnostic gateway can be either wireless or wired.

FIGS. 2A and 2B show schematic diagrams of a telemetric device 20 of a preferred embodiment of the present invention. The telemetric device 20 preferably includes a data aggregator 24, a processor 25, and a cloud communication interface 26. Each of the data aggregator 24, the processor 25, and the cloud communication interface 26 are discussed below.

Data Aggregator

The data aggregator 24 includes a wired or wireless bridge/gateway that exchanges data to and from the vehicle 22 and/or the wired devices and objects 21 and/or the wireless devices and objects 23. The term "devices" includes active devices such as devices that are powered, and the term "objects" includes passive devices such as smart cards or other devices equipped with RFID but that are not powered. The data aggregator 24 discovers and interprets modes of communication preferably in real-time. The data aggregator learns or defines the communication mode (e.g. protocols, languages, etc.) between the connected vehicle 22, the wired devices and objects 21, and the wireless devices and objects 23. The data aggregator 24 communicates data directly to the processor 25 for further analysis, execution, or communication to/from (i.e., bidirectional) the cloud services 27.

The data aggregator 24 discovers the communication modes preferably in real-time. The data aggregator 24 can interpret and communicate data from vehicle 22, the wired devices and objects 21, the wireless devices and objects 23. The processor 25 receives the interpreted data and then processes the interpreted data. For example, the telemetric device 20 can include a vehicle interfacing chip/module that interprets the OBDII communication codes received from the OBDII port from a vehicle. The processor 25 can then further process the interpreted OBDII communication codes.

The data aggregator 24 can be wired for communication with, for example, the diagnostic gateway, the electrical system, or any other wired juncture. The data aggregator 24 can wirelessly communicate with, for example, a keyless entry system, and discoverable devices internal or external to the vehicle. Discoverable devices include, but are not limited to phones, laptops, computers, navigation devices, near field communication devices, and any suitable device with a discoverable communication. The data aggregator 24 can also receive data from the processor 25 to communicate the data to any device that the data aggregator 24 is connected with, including, for example, the diagnostic gateway or discoverable device. That is, the data aggregator 24 can create bidirectional communication between the processor 25 and any device that the data aggregator 24 is connected with. The data aggregator 24 can also collect data from the input/output (I/O) devices 60 included with the telemetric device 20. Once the data is collected, the data is communicated to the processor 25 for computing. The discovering process of the data aggregator 24 is discussed below.

The data aggregator 24 can include I/O devices 60 that can enhance the functionality or remote measuring, reporting, and communication of data. For example, data aggregator 24 could included a GPS module 28 that provides location data or a display or LEDs 29 that indicate that the telemetric device 20 is 'ON' or is transmitting data. Further, other I/O devices 30 could be a joystick or keyboard, radar, or condition sensors such as fuel, tire pressure, motion, weight, temperature sensors and devices that can be a combination thereof, such as an audio/visual system that can receive input from a user and broadcast outputs (e.g., an infotainment platform with interactive displays and speakers, which can be used for playing movies or music, providing a web-browser, or similar programs and applications).

The data aggregator 24 also includes a communication interface 34 that can include a wired module 35 or wireless module 36 that enables wired or wireless communication. The communication interface 34 can perform the physical/active discovering initiated by the data aggregator 24 and can simultaneously communicate with any desired device, including, but not limited to, devices, objects, and vehicles. The communication device can use any suitable protocol, including proprietary protocols and open protocols such as the Open Systems Interconnection (OSI).

Discovering Devices for Connection

Vehicle communication protocols can be discovered by detecting the presence of outgoing data packets, including, for example, wireless RF communication in the vehicle. The telemetric device can first detect as soon as it is turned on. It could be the first action that the telemetric device 20 would take. The telemetric device 20 will begin detecting for any device within a certain radius around the telemetric device. The telemetric device 20 can detect using any of its communication protocols. Different communication protocols can have different radiuses in which a device using that communication protocol can be discovered. For example, using the Bluetooth® protocol, the telemetric device 20 can discover Bluetooth® devices within a radius, for example, of about five or ten feet, and using the Wi-Fi protocol, the telemetric device 20 can discover Wi-Fi devices within a radius, for example, of about 50 or 100 feet. Once the telemetric device 20 discovers a device, it will attempt to communicate with the device and determine what protocol or language should be used to communicate with the device. If it is successful, then a communication link will be established so that data can be communicated between the cloud services 27 and the device, which could allow the device to be controlled or interfaced.

For example, the telemetric device 20 could establish communication with a cell phone, an electronic garage door, a vehicle, a wireless home network, or any suitable device that can be connected through a wired or wireless network. It is also possible that the telemetric device 20 can communicate with other telemetric devices located in other vehicles. This device-to-device communication can be accomplished either directly between the telemetric devices or through the internet via, for example, a cellular network interface.

After the telemetric device 20 is on and has established communication with the cloud services 27 (i.e., in the active mode), the telemetric device 20 will begin a continuous loop of searching for a device using one of its communication protocols within a pre-determined radius (e.g., five feet, 100 yards, one mile, five miles). The telemetric device 20 will transmit frequencies including, but not limited to, infra-red (IR), Bluetooth®, 802.11, motion, sonar, radar, etc. If a device is located within the predetermined radius and is receptive to the communication protocol transmitted by the telemetric device 20, then telemetric device will pair with the located device.

This process will be specific to the communication protocol being used. For example, if telemetric device 20 uses the communication protocol 802.11, then the telemetric device 20 would transmit a wireless signal in search of a wireless network. For example, if the wireless signal is broadcasted and received by a wireless router, then a connection can be established. The wireless router then transmits a signal to the telemetric device 20 and allows for the pairing with the telemetric device 20. Thus, bidirectional communication is established between the wireless router and the telemetric device 20. The process would be similar for any device in or near the vehicle.

A. Wired Telemetric Device Connection

A wired telemetric device 20 could be connected directly to the vehicle, for example, through the OBDII port, fiber wire, or any other suitable connection method. The telemetric device 20 would still detect its surroundings, but communication would be much more direct because the device is wired to the telemetric device 20. The telemetric device 20 would establish bidirectional communication using the protocol to which it is connected. For example, if the OBDII port is used, then the OBDII protocol is used. Once the bidirectional communication is opened, the telemetric device 20 can begin communicating directly with whatever device it is wired to. For example, the telemetric device 20 could detect the presence of the vehicle's radio or navigation/computer system and establish bidirectional communications directly with vehicle's radio or navigation/computer system, without the communications going through the ECU or the CAN port.

B. Wireless Telemetric Device Connection

Wireless connection would be similar to the steps discussed above for a wired connection except that there would be no direct connection using wiring. The telemetric device 20 would detect the presence of any outgoing transmissions from the vehicle or devices in or around the vehicle. The telemetric device could use, for example, a RF transponder for wireless communication. After discovering the device, bidirectional communication can be established between the discovered device and the telemetric device 20. For example, to control the vehicle's locks, the telemetric device 20 could discover a signal being transmitted by an RF transponder and replicate the signal, allowing the telemetric device 20 to lock and unlock the vehicle doors by replicating the transponder communication.

Processor 25

The processor 25 provides most of the functions of the telemetric device 20. The processor 25 can have an embedded or a general-purpose architecture, depending on the desired functionality of the telemetric device 20. The processor 25 processes the data received from the data aggregator 24, then passes the processed data to the cloud communication interface 26, where data is sent to the cloud services 27. Additionally, the cloud communication interface 26 provides bidirectional communication between the cloud services 27 and the telemetric device 20.

The processor 25 includes 1) system firmware 31, which is the operating system software of the telemetric device 20, 2) main memory 37 that can include RAM 39 and ROM 38 and that can store computer programs that, when executed by the processor 25, provide the functions of the telemetric device 20, and 3) storage device 40 that stores the most data. ROM 38 preferably stores data/instructions critical to the functioning of the telemetric device 20. The storage device 40 can include, for example, a removable memory device such as a USB thumb drive, MP3 player with internal memory, or other suitable removable memory device or other suitable media devices. The storage device 40 can include multiple devices. For example, the storage device 40 can include an internal hard drive and a USB thumb drive.

The processor 25 can compress/uncompress, encrypt/decrypt, and convert/translate the data. For data being transmitted by the telemetric device 20, the processor 25 can perform on the data to be transmitted one or more of compression, encryption, and conversion into binary format. For data being received by the telemetric device 20, the processor 25 can perform on the received data one or more of uncompression, decryption, and translation into useful data. Typically, for data that is to be sent, the processor 25 converts the data into a binary format, compresses the binary data, and then encrypts the compressed data, and for data that is received, the processor 25 decrypts the data, uncompresses the decrypted data, and translates the uncompressed data into useful data.

A. Compression/Uncompression

The telemetric device 20 can transmit and receive either compressed or raw data. The telemetric device 20 can transmit a portion of the data stream using compression and another portion of the data stream without compressing the data. The telemetric device can uncompress any received data.

B. Encryption/Decryption

The telemetric device 20 can transmit and receive either an encrypted or unencrypted stream of data. The telemetric device 20 preferably uses a cipher or key to encrypt the data that is going to be sent. The telemetric device 20 can transmit a portion of the data stream using encryption and another portion of the data stream without using encryption. When the received data is encrypted, the telemetric device 20 can decrypt the data using a standard decryption process. The telemetric device 20 stores the requisite cipher and key necessary to decrypt the encrypted data. The telemetric device 20 uses the cipher and key to decrypt the encrypted data so that the decrypted data can be further processed.

C. Conversion to Binary Format/Translation into Useful Data

The telemetric device 20 can translate data into binary form to reduce the size of data transmitted from the device to the cloud services 27 and can convert data in binary form into useful data. The telemetric device 20 can transmit none, a portion, or all of the data stream in binary form. The telemetric device 20 can translate data received in binary form into useful data that the telemetric device 20 understands.

D. Communication Device

The cloud communication interface 26 in the telemetry device 20 can include a plurality of communication protocols, such as TCP, UDP, FTP, or a proprietary protocol thereof, over one or more of the following interfaces: GSM, CDMA, GPRS, WAP, and UMTS. The general/miscellaneous communication interface 34 within the data aggregator 24 of the telemetric device 20 can use any suitable protocol, including Bluetooth®, Wi-Fi, RF, PAN (Personal Area Network), and/or Near Field Communications.

F. Power Source

The power source 33 provides power for the telemetric device 20. The power source 33 can be connected to the electrical system of the vehicle, or the power source 33 can include a power component, such as a battery, that can be charged through the electrical system of the vehicle. Preferably, the telemetric device 20 is connected to the power source 33 such that the telemetric device 20 is always on and transmitting data, even if the vehicle is not on or running. For example, if the telemetric device 20 is connected to the battery of a vehicle, then the telemetric device 20 can transmit data even when the vehicle is off. Preferably, the telemetric device 20 monitors the condition of the vehicle's battery (or other similar power source) so that the telemetric device 20 stops transmitting to prevent the vehicle's battery from discharging to the point that the battery will not start the vehicle.

Real-Time Data Transfers

The telemetric device 20 preferably automatically provides real-time or near real-time data of the vehicle to which it is connected. That is, the telemetric device 20 provides a continuous or nearly continuous data stream without any prompting by a user. The telemetric device 20 preferably provides the data stream without any input or prompting by a user and is not based on any condition or change in a condition of the vehicle to which it is connected. The telemetric device 20 will, simultaneously and in real-time, provide a bidirectional communication channel for data to be communicated to and from the vehicle. The telemetric device 20 preferably has the capability of sending remote signals to the vehicle that can control functions and operations of the vehicle.

Frequency of Data

The telemetric device 20 can update the data with any frequency. For example, the telemetric device 20 can have an update frequency of about 10 times a second (real-time) or can have an update frequency of about once every couple of minutes (near real-time), or can have any update frequency between these two end-points. The update frequency can be fixed or can be variable. For example, if the telemetric device 20 senses that the vehicle has not moved after a fixed period of time, then the telemetric device 20 can reduce the update frequency, which can reduce power consumption. Also, the update frequency can be changed depending upon which type of network that the telemetric device 20 is connected to. For example, if the telemetric device 20 is connected to a network that can handle higher data volume, then the update frequency can be increased. Conversely, if the telemetric device 20 is connected to a network that can only handle lower data volume, then the update frequency can be decreased. Different data can be updated with different frequencies, including reducing the update frequency to zero, i.e. not updating the data. For example, if the vehicle enters an area with a network with lower data volume, the update frequency of the location data of the vehicle can be maintained, while the update frequency at which the temperature outside the vehicle is updated can be lowered or reduced to zero. It is also possible that different data can be transmitted based on a change of vehicle conditions. For example, if the telemetric device 20 detects that a window is broken or that there is movement within the vehicle at a time when there should not be movement, then the telemetric device 20 can transmit data concerning a possible break-in. The telemetric device 20 can also notify predetermined people that the vehicle in question has been involved in an accident and is inoperable, via the cloud services 27 or publicly broadcasted to cloud resources 10.

Transmission of Real-Time Data

The telemetric device 20 preferably sends real-time or near real-time location data. The location data is typically based on a GPS data provided by a GPS device. However, the location data could be determined from user input data, LAN data, cellular network data, or any data suitable for determining the vehicle's location. The telemetric device 20 can also transmit data based upon any information received by the data aggregator 24. For example, the telemetric device 20 can transmit data concerning the vehicle's condition. For example, if the vehicle is a car and if the telemetric device 20 is connected to the OBD port of the car, the telemetric device 20 can transmit data indicating that the car needs an oil change or other service or maintenance needs.

Receiving of Real-Time Data

The telemetric device 20 can also receive data. For example, the telemetric device 20 can receive media data such as data for a song. If the telemetric device 20 is an aftermarket product and includes an RF interface, then the telemetric device 20 can play the song using the vehicle's speakers by transmitting the data for the song using an RF protocol to be received by the vehicle's radio. If the telemetric device 20 is original equipment for the vehicle, then the telemetric device 20 is typically integrated with the vehicle's radio, which allows the song to play on the vehicle's radio without using the RF protocol.

Push/Pull of Data

The telemetric device 20 can download and pull rich content and firmware updates after determining such updates are necessary. Once the telemetric device 20 is connected to the vehicle, it runs a continuous loop of queries and commands. Preferably, one such query is to ping the vehicles diagnostic gateway (e.g., the vehicle's ECM or ECU) asking if any firmware/software updates are needed. In addition, the cloud services 27 will also have the requisite knowledge to determine if any firmware or software updates need to be pushed to the diagnostic gateway. In the event that the telemetric device 20 and/or cloud services 27 determine that a firmware update is necessary, either from update files available on the internet or through communication with the diagnostic gateway, the telemetric device 20 will begin downloading the firmware data which may be directed towards the vehicle, devices, or sub-components of the vehicle. The downloading is analogous to downloading an email attachment. Cloud services 27 will send the file to the telemetric device 20. Upon receipt of the file, the telemetric device 20 will open the file and begin downloading the file. The data being downloaded will be stored in the storage device 40 of the telemetric device 20. Once the downloading is complete, the telemetric device 20 will run a completion check to determine if download has completed successful. This completion check could be as simple as determining the initial file size and comparing it to the downloaded file size being stored in the storage device 40 of the telemetric device 20. Once the completion check is complete, the telemetric device 20 can upgrade its own firmware or can send through the diagnostic gateway for a new firmware upgrade to be installed for any connected device, for the vehicle, or for any object within the vehicle. For example, a navigation unit can request a large rich content update from the cloud services 27 after being queried by the telemetric device 20. The navigation software could be out of date and in need of an update or traffic/road conditions need to be sent to the navigation device. The telemetric device 20 would request the download from cloud services 27. Cloud services 27 would send the software upgrade to the telemetric device 20. The telemetric device 20 would begin downloading the file and saving it to the storage device 40 of the telemetric device 20. It is possible that large size file can take substantially longer to download in full, even on a 4G network. Once the download is completed, the telemetric device 20 would run the completion check on the downloaded file for size and completeness. Once the completion check is completed and successful, the telemetric device 20 performs a release of the software upgrade to the navigation unit for installation.

Vehicle Controlling Data

The telemetric device 20 can also receive data that controls the vehicle. For example, the telemetric device 20 can be connected to the vehicle such that, when the telemetric device 20 receives a start-up command, the telemetric device 20 can cause the vehicle to start-up. In a similar fashion, the telemetric device 20 can be used to lock or unlock the vehicle's doors and can be used to determine the location of the vehicle. The telemetric device 20 can be used to control auxiliary functions of the vehicle such as opening/closing of trunk or gas cap or controlling the radio, windows, hood, heated seats, sunroof, etc.

Cloud Communication Interfaces

The telemetric device 20 preferably also includes a cloud communication interface 26 that transmits data to/from the cloud services 27. The physical communication can take place through a wired module 41 or preferably, a wireless module 42, which, for example, can use a wireless network, such as a GSM or CDMA carrier, to communicate data to the cloud services 27 using one of the preferred protocols of TCP, UDP, FTP, or a proprietary protocol thereof. Similarly, the cloud services 27 can contain a TCP, UDP, FTP listener, or a proprietary protocol thereof, for listening to data communicated by the telemetric device 20. The cloud services 27 preferably have no limit to the number of simultaneous connections it can have.

The telemetric device 20 including the data aggregator 24, processor 25, and cloud communication interface 26 can be implemented using either hardware or software. The hardware can include known components such hard drives, DVD drives, CD drives, BlueRay drives, RAM, ROM, one or more processors, one or more electronic displays, and any other suitable hardware devices. The software can be stored on any suitable tangible or non-transitory computer-readable medium such that, when run on the hardware, the functions discussed above are performed.

Data is Transmitted from the Telemetric Device 20 to the Cloud Services 27

The cloud services 27 and the direct clients 11 are each connected to the internet 12. Thus, the telemetric device 20 can transmit and receive data to and from the cloud services 27 and the direct clients 11. The direct clients 11 can provide access to browsers and/or applications 14, which are examples of the direct clients. The telemetric device 20 can also transmit and receive data to and from the cloud services 27 and the cloud resources 10. Examples of cloud resources 10 are content providers, including those that provide media data such as songs and movies, advertisements, social media, etc. The cloud resources 10 could also be social network providers. The cloud services 27 can receive the real-time or near real-time data stream from the telemetric device 20. The cloud services 27 can also provide data to the telemetric device 20. The cloud services 27 can preferably provide data without the need for a call center or prompting by a user. For example, based on the location of vehicle or the location history of the vehicle, the cloud services 27 can return data concerning nearby stores. If the cloud services 27 receive data that indicates that the vehicle needs an oil change, then the cloud services 27 can transmit data indicating the location of a nearby service station where the vehicle's oil can be changed. If the telemetric device 20 includes an LCD display output device or similar display device, then the cloud services 27 can transmit the data to the LCD display output device or similar display device. If the telemetric device 20 does not include an LCD display output device or similar display device, then the cloud services 27 can transmit the data to the wireless device 18, 19 of the operator of the vehicle. The cloud services 27 can transmit a coupon or promotional material in addition to or separately from the information concerning nearby stores.

General Description of the Cloud Services 27

The cloud services 27 are the intelligent processing engine behind the telemetric device 20. The cloud services 27 receive data from the telemetric device 20 for processing and storage. The cloud services 27 are responsible for delivering usable and readable data to the end user for use with the telemetric device 20. The cloud services may also communicate bidirectional data to the cloud resources 10.

Components of the Cloud Services 27

Figure 3:
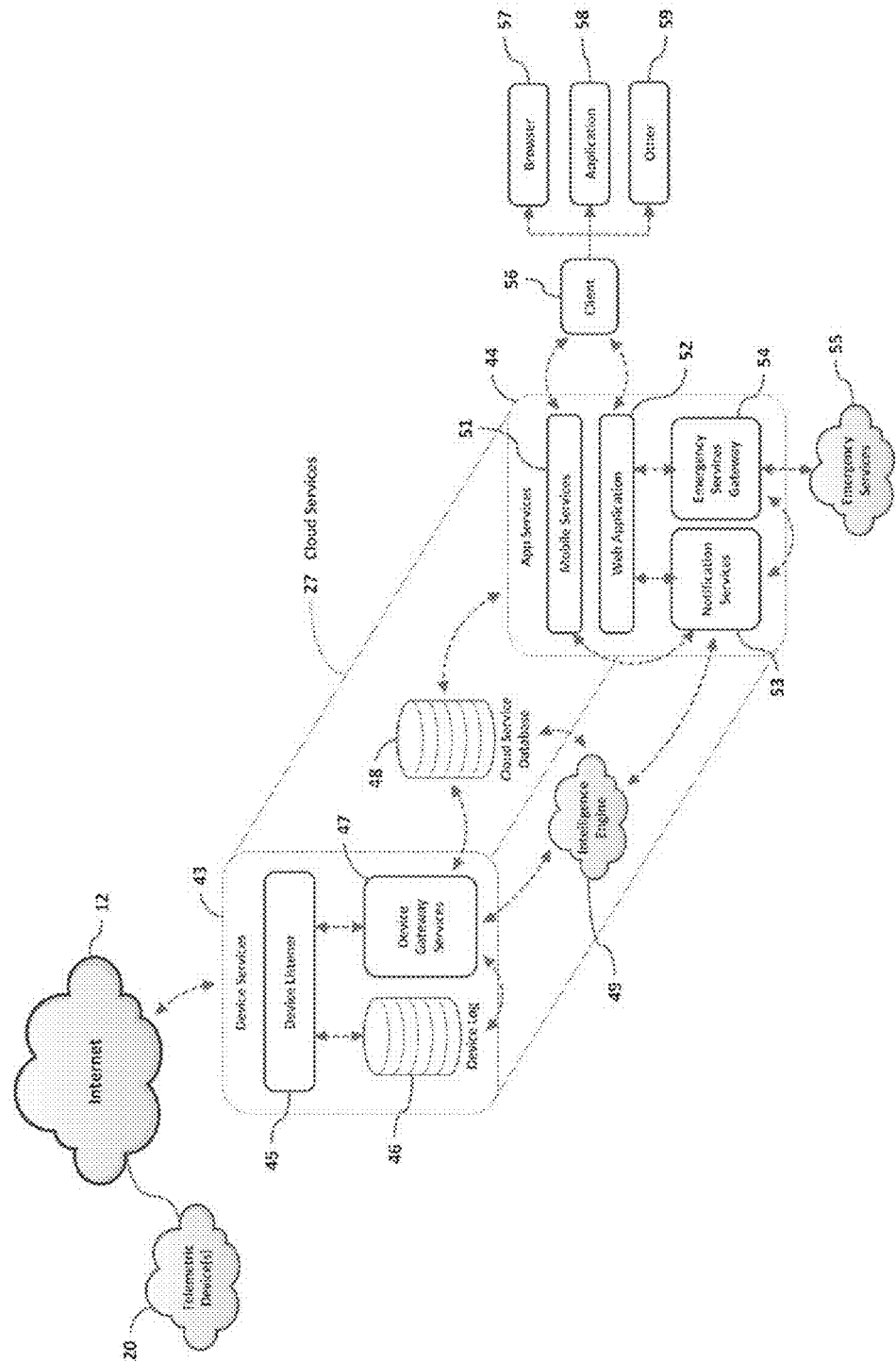
FIG. 3 is a schematic diagram of cloud services according to a preferred embodiment of the present invention.

The cloud services 27 preferably include two main components: device services 43 and application services 44 shown in FIG. 3. The device services 43 preferably include a device listener 45, device log 46, device gateway services 47, cloud services database 48, and intelligence engine 49. The application services 44 preferably include mobile services 51, web applications 52, and notification services 53, emergency services gateway 54.

Device Services 43

The device services 43 shown in FIG. 3 include device listener 45, device log 46, device gateway services 47, cloud services database 48, and intelligence engine 49. The device services 43 serves as the intelligent processing unit of the cloud services 27. The device services 43 receive data from the telemetric device 20 via the device listener 45. The device listener 45 logs the data in the system device log 46. The device listener 45 then transmits the data to the device gateway services 47 where the data is processed into a useful format. For example, the data from the telemetric device 20 could be converted into a binary format, compressed, and encrypted. To process the data into a useful format, the data is decrypted, uncompressed, and translated from binary code into a usable data for further processing. Of course, if the data is not encrypted, then the data does not need to be decrypted; if the data is not compressed, then the data does not need to be uncompressed; and if the data is not in a binary format, then the data does not need to translated into usable data. After the data has undergone the necessary processing, if any, the data is stored in a cloud services database 48 for storage and retrieval by the application services 44 of the cloud services 27.

A. Device Listener 45

The device listener 45 is a bridge between the cloud services 27 and the telemetric device 20. The device listener 45 transmits data between the cloud services 27 and the telemetric device 20. The device listener 45 receives and sends the transmitted data to the device log 46 for logging/reference purposes by the device gateway services 47. The device listener 45 serves primarily as a conduit for data to pass between the telemetric device 20 and the cloud services 27.

The device listener 45 serves as the gatekeeper that prevents unauthorized devices from transmitting or accessing the cloud services 27. The device listener 45 ensures that only data using the proper protocols is transmitted and received by the device gateway services 47. The device listener 45 verifies that the devices attempting to communicate with the cloud services 27 are using an identifiable language that the cloud services 27 can understand. Typically, the data will be transmitted using a proprietary protocol, but it is also possible that the data is transmitted using an open protocol. The proprietary communication is preferably based on and compatible with an open protocol, such as TCP, UDP, or FTP protocols. For example, the data could be transmitted with the proprietary communication based on the TCP protocol.

B. Device Log 46

The device log 46 stores data transmitted between the telemetric device 20 and the cloud services 27. The device log 46 receives the data transmitted from the telemetric device 20 to the cloud services 27 via the device listener 45. The device log 46 records the data transmission and saves the data. It is possible that the device gateway services 47 receive the data from the device log 46 instead of directly from the device listener 45.

The device log 46 provides an audit trail that allows data transmissions between the telemetric device 20 and the cloud services 27 to be recorded in an unprocessed format (i.e. unmodified data from the telemetric device 20 that has not been processed) for further, more-in-depth analysis at a later time. The cloud services 27 can recall the data stored on the device log 46 and extract for analytical purposes certain data that was not initially extracted. The device log 46 is a data mine for unprocessed data collected from the data transmissions of the telemetric device 20. The device log 46 preferably includes unprocessed data from a multitude of telemetric devices 20.

C. Device Gateway Services 47

After receiving the unprocessed data from the device listener 45, the device gateway services 47 determines if the data is compressed, encrypted, or in a binary format. If necessary, the device gateway services 47 uncompresses, decrypts, and translates the data transmitted from the telemetric device 20. As explained above, the processor 25 of the telemetric device 20 can compress, encrypt, and convert the data before the data is transmitted to the cloud services 27. When the data is encrypted, the device gateway services 47 can decrypt the data using a standard decryption process. The device gateway services 47 can store the requisite cipher or key necessary to decrypt the encrypted data. The device gateway services 47 uses the cipher to decrypt the encrypted data so that the decrypted data can be further processed.

The telemetric device 20 can compress the data. The device gateway services 47 can uncompress any received data that has been compressed by the telemetric device 20.

The telemetric device 20 can translate the data into a binary format. This binary data is virtually unusable by a computer processor until translated into useful data. The device gateway services 47 translate the data transmitted from the telemetric device 20 into useful data so that the data can be processed by and stored in the cloud services database 48.

After the data is translated into useful data, the device gateway services 47 parse the data into individual data pieces that are stored in the cloud services database 48. The device gateway services 47 parses the data into individual data pieces that are stored in the appropriate locations or referenced within the data structures (e.g. data tables) of the cloud services database 48.

Additionally, the device gateway services 47 preferably place trigger mechanisms for the emergency services gateway 54 and notification services 53. The intelligence engine 49 listens for the trigger mechanisms. When the intelligence engine 49 receives data with a trigger mechanism, the intelligence engine 49 transmits the data to the corresponding data for emergency services gateway 54 and notification services 53 for providing an alert or notification, which is discussed below.

D. Cloud Services Database 48

The cloud services database 48 receives and stores the data from the device gateway services 47. The cloud services database 48 can store the data in various data tables for storing the processed data that can be used by the device gateway services 47, intelligence engine 49, and the application services 44. For example, data tables can include data tables that are particular to location, user info, diagnostics, vehicle data, etc. It is possible to delete unnecessary data tables once the data tables are no longer needed and to add new tables that have a structure and/or data that is different from existing tables. The deletion and addition of data tables can be performed by a system administrator, for example.

The data stored by the cloud services database 48 is not limited to the data received from the telemetric device 20. The cloud services database 48 also stores information, data, and content from the application services 44. Within the cloud services database 48, information is consumer friendly data; data is machine readable content accessed using, for example, an application programming interface (API), which is a particular set of rules and specifications that a software program can follow to access and make use of the services and resources provided by another particular software program that implements that API; and content is music, files, or other data, for example, needed by the application services 44. Further, if a user or user group is created, for example, from the application services 44, this data is stored in the cloud service database 48 for reference by the mobile services 51 or web application 52. Additionally, the cloud services database 48 could also store user preferences, which are not particular to a telemetric device 20, but are when a mobile application communicates with the application services 44.

E. Intelligence Engine 49

The intelligence engine 49 is the location-aware analytical engine that powers the cloud services 27, including both mobile- and web-based applications. Intelligence engine 49 is preferably the event-based intelligent engine discussed in U.S. application Ser. No. 13/070,459 concurrently filed herewith and entitled "System for Event Based Intelligent Targeting." Intelligence engine 49 enhances the delivery of notifications from the telemetric device 20 to the cloud services 27 and end user. The notifications can be catered notifications that are only sent to a single user or can be non-unique notices that are sent to a plurality of users. For example, a unique notice could be a coupon to a vehicle operator that needs an oil change that is near a specific repair shop. A non-unique notice could be a coupon for a coffee shop for all vehicle operators within a fixed radius of the coffee shop. The notifications can be sophisticated notifications based on data received from the telemetric device 20 or other data such as weather or time. That is, sophisticated notifications can be based on one or more of the location of the vehicle, time, user input, etc. For example, with regard to the unique repair shop coupon discussed above, the intelligence engine 49 can determine based on the time to send the coupon and only if the repair shop is open.

The intelligence engine 49 performs additional analysis on the data stored in the cloud services database 48 to provide catered and/or sophisticated notifications through notification services 53 of the application services 44. While the intelligence engine 49 can use the notification services 53 of the cloud services 27 to transmit its analyzed data, it can also have its own notification services. The intelligence engine 49 processes and analyzes the data transmitted from the device gateway services 47.

Application Services 44

The application services 44 provide a public interface so that the public can access the information, data, and content stored in the cloud services database 48. As shown in FIG. 3, the application services 44 can include, but is not limited to, mobile services 51, web applications 52, notification services 53, and an emergency services gateway 54.

A. Mobile Services 51

The mobile services 51 within the application services 44 provide the public interface optimized for mobile content within the cloud services 27. As shown in FIG. 3, mobile clients 56 (e.g., cell-phones, PDAs, smart-phones, tablets, laptops, etc.) can communicate with the cloud services 27 though the mobile services 51. For example, this allows a mobile client 57 to communicate with telemetric device 20, which allows mobile client 57 to control the functions of the vehicle, including, for example, starting the vehicle.

B. Web Application 52

The web application 52 is a public interface similar to the mobile services 51 but optimized/enhanced for a richer experience through a web browser 57. The web application 52 is also a popular choice due to the ubiquity of web browsers 57. For example, an end user can communicate with the telemetric device 20 through a web browser 57 to control the functions of the vehicle, including, for example, starting the vehicle.

C. Client 56

A client 56 can include, but is not limited to, cell-phones, PDAs, smart-phones, laptops, smart-devices, etc. A client 56 can use a browser 57, an application 58, or other 59 to communicate with the application services 44.

D. Browers, Application, Other

A client 56 can connect to the application services 44 through wired or wireless networks. The client 56 can use a web browser 57 that is a software application designed for the retrieving, presenting, and traversing of information resources on the internet. The client 56 can also use an application 58, which is specifically programmed to perform, manage, or communicate directly with the application services 44 of the cloud services 27. Further, if the client 56 uses an application 58, then an API is used in communication with the application services 44. Other 59 in FIG. 3 references singular protocols, such as, but not limited to, SMS, MMS, POP3, IMAP, or any other proprietary or OSI used to access the application services 44 within the cloud services 27.

E. Notification Services+Emergency Items

The notification services 53 facilitate the timely delivery of alerts and/or similar content to the mobile services 51, web application 52, and emergency services gateway 54. The cloud services 27 can also provide alerts if the telemetric device 20 sends data (time+event) indicating that the vehicle has been in an accident or similar event driven alert requiring notification as determined by the cloud services 27. These alerts are then sent to the emergency services gateway 54, where they are then processed and/or forwarded to emergency services 55 in FIG. 3, which include municipalities, emergency response teams, E911 services, public dispatch centers, etc. The dispatched emergency services can include an ambulance, firemen, and police and/or predetermined persons who are not in the vehicle and/or persons or groups set forth by the cloud services 27. Together with the cloud services 27, the emergency services also contain a significant level of intelligence. For example, if the cloud service 27 has detected a vehicle accident or similar emergency event, then the emergency services gateway 54 can transmit a message to designated authorities to investigate the event, as well as, transmit message to a first predetermined contact. If the cloud services 27 detect that the first predetermined contact was not in the vehicle during the emergency event or not available for contact, then it can try a second predetermined contact.

The cloud services 27 including the device services 43, intelligence engine 49, and application services 26 can be implemented using either hardware or software. The hardware can include known components such hard drives, DVD drives, CD drives, BlueRay drives, RAM, ROM, one or more processors, one or more electronic displays, and any other suitable hardware devices. The software can be stored on any suitable tangible or non-transitory computer-readable medium such that, when run on the hardware, the functions discussed above are performed.

Further, it is also possible for the telemetric device 20 to communicate with other telemetric devices and wireless/wired devices in or around the vehicle based upon a predetermined radius from telemetric device. The device-to-device communication can be accomplished either directly or indirectly through the cloud services 27. For example the cloud services 27 may utilize the device-to-device communication with telemetric device 20 to compare accelerometers measuring G-forces in wired/wireless devices in or around the vehicle during an emergency event.

SPECIFIC EXAMPLE OF A PREFERRED EMBODIMENT OF THE PRESENT INVENTION

Figure 4:
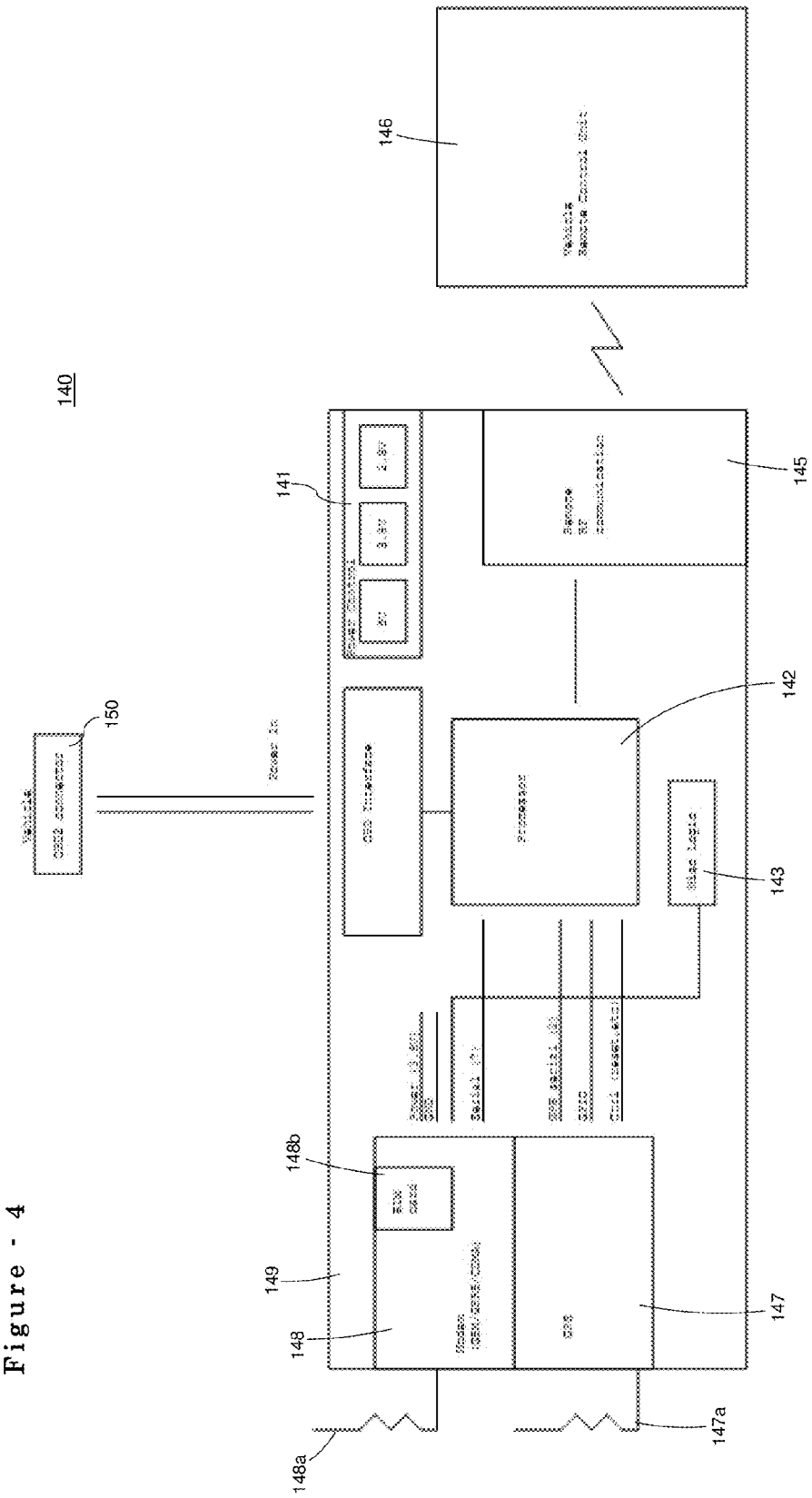
FIG. 4 shows a block diagram of an example of the telemetric device according to a preferred embodiment of the present invention.

FIG. 4 shows a block diagram of an example of a telemetric device 140 according to a preferred embodiment of the present invention. This telemetric device 140 is an example of an after-market product that does not include a display device such as an LCD screen, for example. However, such a display device could be added to the telemetric device 140. The main unit 149 of the telemetric device 140 includes a power control 141, processor 142, miscellaneous logic 143, and remote 145. The main unit is connected to an OBD2 connector 150, vehicle remote control unit 146, GPS module 147, and GSM/GPRS modem 148.

The OBD2 connector 150 connects the telemetric device 140 to the diagnostic system of the vehicle, typically via a wired connection, for example. The power control 141 provides 5 V and 3.8 V voltages for the other devices of the telemetric device 140. The power control 141 could provide voltages other than 5 V and 3.8 V as well. The power control 141 can also include a charge circuit for charging batteries (not shown). The telemetric device 140 also includes a processor 142 and miscellaneous logic 143.

The remote 145 communicates with a vehicle remote control unit 146, typically via a wireless connection. The vehicle remote control unit 146 is cable of, for example, of starting the vehicle and of locking/unlocking the vehicle's doors.

The GPS module 147 includes an antenna 147a, and the GSM/GPRS modem 148 includes an antenna 148a and a SIM card 148b. The GPS module 147 and the GSM/GPRS modem 148 shown in FIG. 4 are connected to the main unit 149. However, it also possible to include the GPS module 147 and the GSM/GPRS modem 148 with the main unit 149. While the GPS module 147 and GSM/GPRS modem are shown in FIG. 4 as a single unit, they can also be separate units.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A telemetric device for a vehicle, comprising:
   a location determining device arranged to determine a location of the vehicle; and
   a transmitting device arranged to transmit location data concerning the vehicle at a transmission frequency between about ten times per second and about once every four minutes and wherein the transmission of the location data is not based on a condition of the vehicle and is without prompting by a user.

2. The telemetric device according to claim 1, wherein the telemetric device is arranged to communicate with a wireless device.

3. The telemetric device according to claim 2, wherein the wireless device is one of a cell phone and a tablet computer.

4. The telemetric device according to claim 2, wherein the telemetric device directly communicates with the wireless device.

5. The telemetric device according to claim 2, wherein the telemetric device communicates with the wireless device via a cellular network and the internet.

6. The telemetric device according to claim 1, and further comprising a display device.

7. The telemetric device according to claim 1, wherein the location determining device is a GPS device.

8. The telemetric device according to claim 1, wherein the transmitting device communicates through a cellular network interface.

9. The telemetric device according to claim 1, wherein the telemetric device is connected to the diagnostic system of the vehicle.

10. The telemetric device according to claim 1, wherein at least a portion of data transmitted by the transmitting device is encrypted.

11. The telemetric device according to claim 1, wherein the transmitting device is arranged to transmit data when the vehicle is turned off.

12. The telemetric device according to claim 1, wherein data transmitted by the transmitting device is transmitted with a variable transmission frequency.

13. The telemetric device according to claim 1, wherein data transmitted by the transmitting device includes data indicating the condition of the vehicle.

14. The telemetric device according to claim 1, wherein the vehicle is one of a car, a truck, a train, a plane, a motorcycle, a bus, a recreational vehicle, and a boat.

15. The telemetric device according to claim 1, and further comprising at least one cellular network interface, a TCP/IP interface, VOIP interface, and an interface that uses one or more of OBD, Bluetooth, Wi-Fi, and RF.

16. A communication system, comprising:
   a telemetric device according to claim 1 connected to a vehicle; and
   a cloud service connected to the telemetric device via the internet.

17. The communication system according to claim 16, wherein the telemetric device and the cloud service are also connected via a public switched telephone network.

18. The communication system according to claim 16, wherein the telemetric device is connected to a media content provider via the internet.

19. The telemetric device according to claim 1, wherein the telemetric device continuously searches for a device or an object within a predetermined radius of the telemetric device.

20. The telemetric device according to claim 1, wherein the telemetric device discovers modes of communication with a device or an object in real-time or near real-time.

21. The telemetric device according to claim 20, wherein the telemetric device detects data packets in the vehicle to discover the modes of communication.

22. The telemetric device according to claim 1, wherein the telemetric device simultaneously searches for a device or an object and communicates with one or more of the following:
the vehicle;
at least one device connected to the telemetric device; and
at least one object connected to the telemetric device.

23. The telemetric device according to claim 1, wherein the telemetric device performs one or more of the following, without any prompting by a user:
compress and decompress data;
encrypt decrypt data; and
convert and translate data into and from a binary format.

24. The telemetric device according to claim 1, wherein the telemetric device detects changes in an exterior of the vehicle and transmits a notification to a user if a change in the exterior of the vehicle has occurred.

25. The telemetric device according to claim 1, wherein the telemetric device bidirectionally communicates with one or more of the following:
the vehicle;
at least one device connected to the telemetric device; and
at least one object connected to the telemetric device.

26. The telemetric device according to claim 1, wherein the telemetric device continuously or nearly continuously streams data without any prompting by a user.

27. The telemetric device according to claim 1, wherein, if the telemetric device detects that a window of the vehicle is broken or that there is movement within the vehicle at a time when there should not be any movement within the vehicle, then the telemetric device transmits a notification concerning the window or the movement within the vehicle.

28. The telemetric device according to claim 1, wherein the telemetric device updates firmware stored in the telemetric device.

29. The telemetric device according to claim 1, wherein the telemetric device provides new firmware to be installed on one or more of the following:
the vehicle;
at least one device connected to the telemetric device; and
at least one object connected to the telemetric device.

30. A telemetric device for a vehicle, comprising:
a location determining device arranged to determine a location of the vehicle; and
a transmitting device arranged to transmit location data concerning the vehicle, wherein the transmission of the location data is not based on a condition of the vehicle and is without prompting by a user, and wherein data transmitted by the transmitting device is transmitted with a transmission frequency that is changed based on data volume limitations of a network to which the telemetric device is connected.

31. A communication system, comprising:
a telemetric device according to claim 30 connected to a vehicle; and
a cloud service connected to the telemetric device via the internet.

32. A telemetric device for a vehicle, comprising:
a location determining device arranged to determine a location of the vehicle; and
a transmitting device arranged to transmit location data concerning the vehicle, wherein the transmission of the location data is not based on a condition of the vehicle and is without prompting by a user, and wherein, if the telemetric device senses that the vehicle has not moved after a fixed period of time, then the telemetric device reduces an update frequency of the telemetric device.

33. A communication system, comprising:
a telemetric device according to claim 32 connected to a vehicle; and
a cloud service connected to the telemetric device via the internet.

34. A telemetric device for a vehicle, comprising:
a location determining device arranged to determine a location of the vehicle; and
a transmitting device arranged to transmit location data concerning the vehicle, wherein the transmission of the location data is not based on a condition of the vehicle and is without prompting by a user, and wherein, if the telemetric device detects that the telemetric device is connected to a network that handles high data volume, then the telemetric device increases an update frequency of the telemetric device.

35. A communication system, comprising:
a telemetric device according to claim 34 connected to a vehicle; and
a cloud service connected to the telemetric device via the internet.

* * * * *